Aug. 12, 1924.

C. WIMSON

ROTARY BAKING MACHINE

Filed May 2, 1923

WITNESSES
Wm. P. Goebel
A. L. Kitchin

INVENTOR
CARL WIMSON
BY Munn & Co
ATTORNEYS

Aug. 12, 1924.
C. WIMSON
1,505,001
ROTARY BAKING MACHINE
Filed May 2, 1923
6 Sheets-Sheet 3
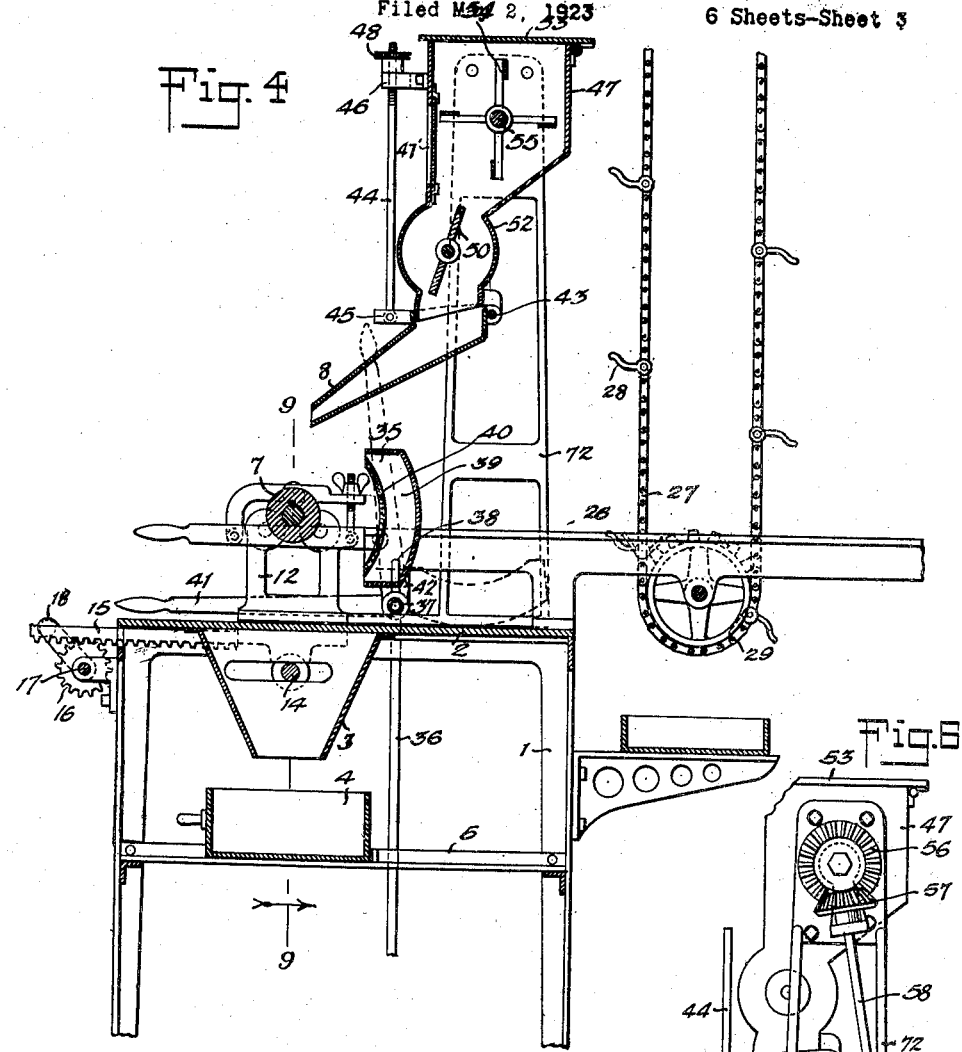
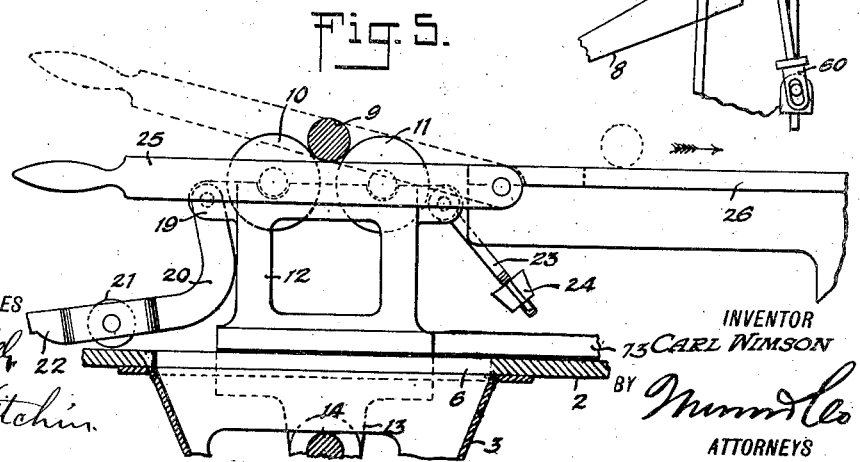
WITNESSES
INVENTOR
CARL WIMSON
BY
ATTORNEYS Aug. 12, 1924.
C. WIMSON
1,505,001
ROTARY BAKING MACHINE
Filed May 2, 1923 6 Sheets-Sheet 4
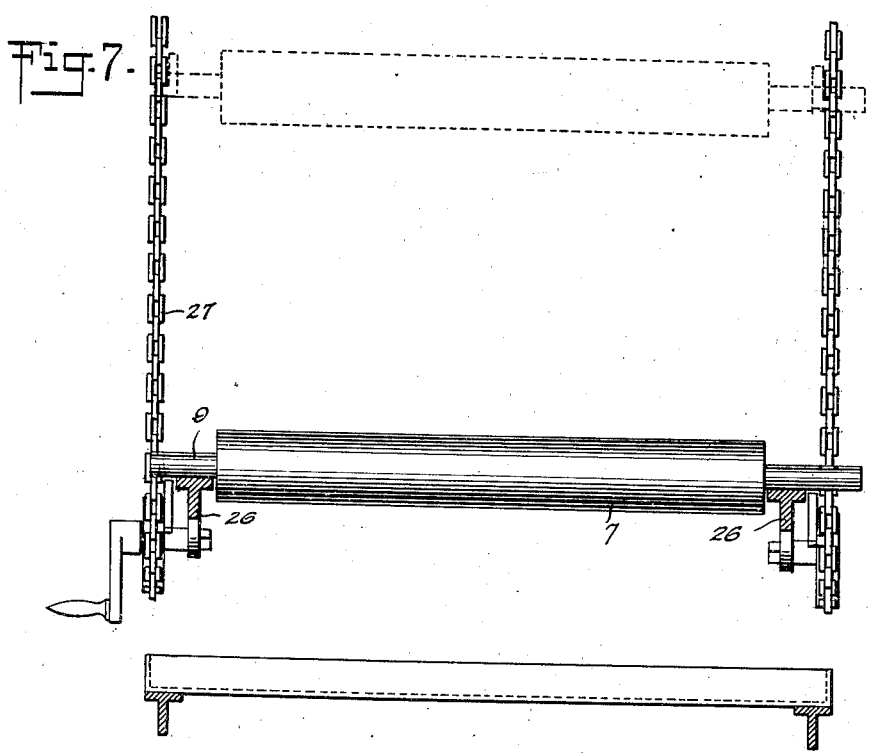
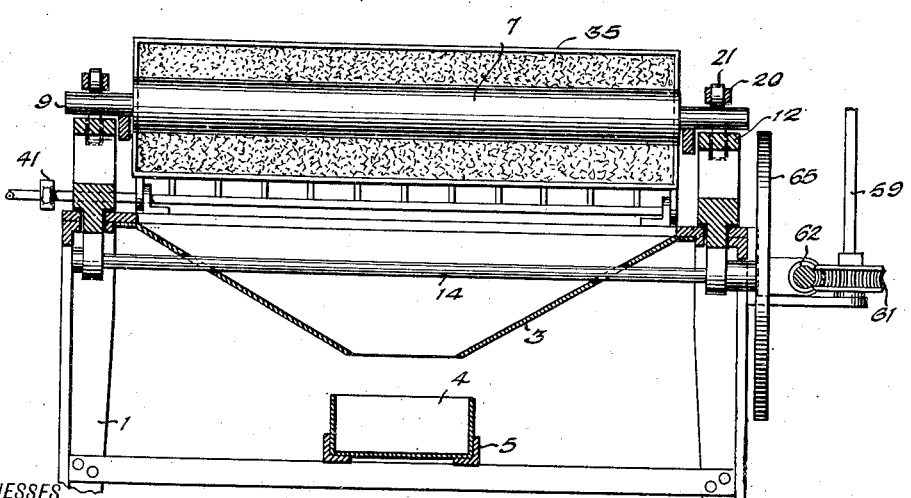

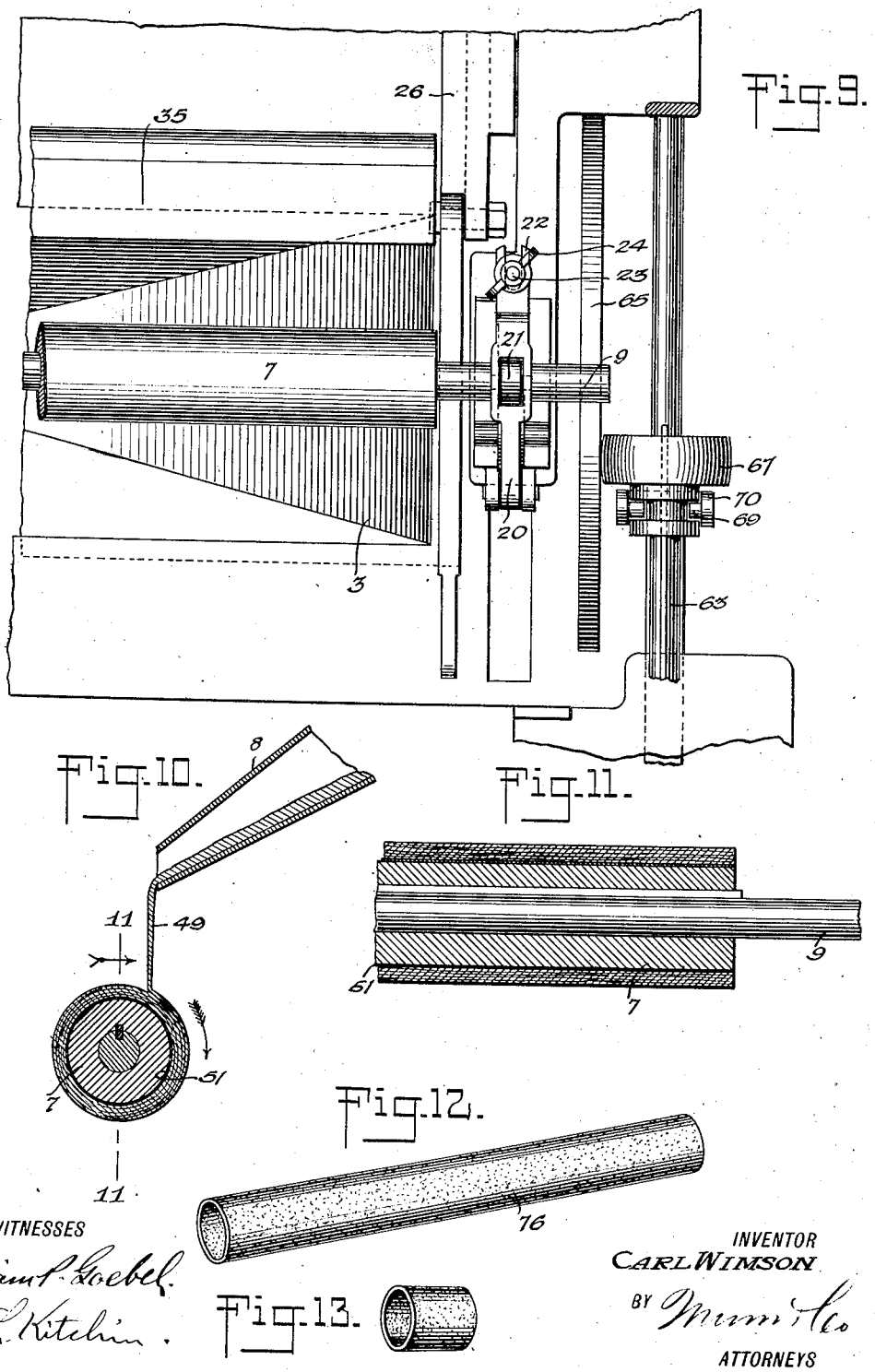

Aug. 12, 1924.                                                                    1,505,001
C. WIMSON
ROTARY BAKING MACHINE
Filed May 2, 1923                              6 Sheets-Sheet 6
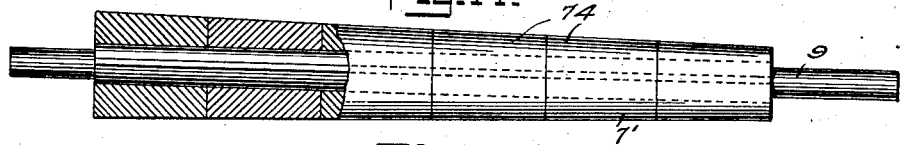
Fig.14.
Fig.15.
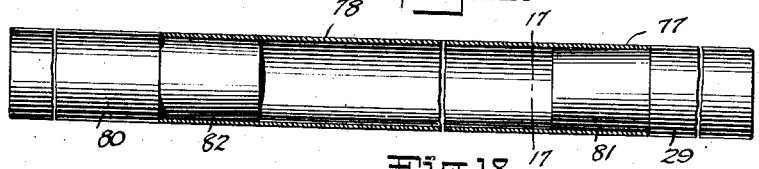
Fig.16.
Fig.17.
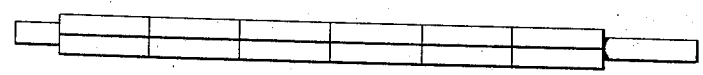
Fig.18.
Fig.19.
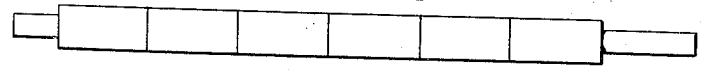
Fig.20.
Fig.21.
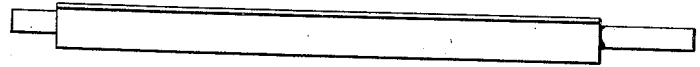
Fig.22.
Fig.23.
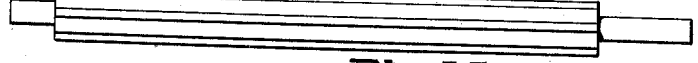
Fig.24.
Fig.25.
Fig.26.
Fig.27.
Fig.28.
Fig.29.
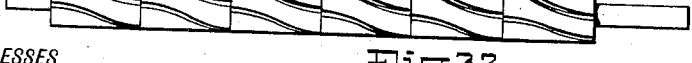
Fig.30.
Fig.31.
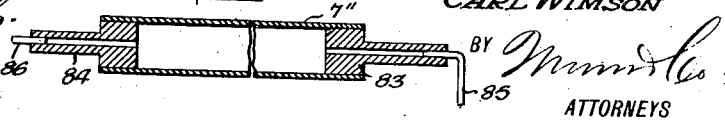
Fig.32.
WITNESSES
INVENTOR
CARL WIMSON
BY
ATTORNEYS

Patented Aug. 12, 1924.

1,505,001

UNITED STATES PATENT OFFICE.

CARL WIMSON, OF NEW YORK, N. Y.

ROTARY BAKING MACHINE.

Application filed May 2, 1923. Serial No. 636,181.

*To all whom it may concern:*

Be it known that I, CARL WIMSON, a citizen of Esthonia, and a resident of the city of New York, borough of Manhattan, in the county and State of New York, have invented a new and Improved Rotary Baking Machine, of which the following is a full, clear, and exact description.

This invention relates to a rotary baking machine and has for an object to provide a construction which is used for baking pastry or other articles of food while the dough is being rotated.

Another object is to provide a machine in which tubular articles of pastry are baked of varying thickness according to the demand of the customer.

A still further object of the invention is to provide a baking machine for baking pastry which is so arranged that the dough is baked as it is applied to a shaper.

An additional object of the invention is to provide a machine designed to bake tubular articles of pastry and discharge them successively to a point of second operation where a second treatment is provided for the baked article.

In the accompanying drawings—

Figure 4 is a sectional view through Figure 1 approximately on line 4—4.

Figure 5 is a fragmentary sectional view through Figure 1 approximately on line 5—5, the same being on an enlarged scale.

Figure 6 is a fragmentary side view of certain driving mechanism shown in Figure 2.

Figure 7 is a sectional view through Figure 2 approximately on line 7—7.

Figure 8 is a fragmentary sectional view through Figure 4 on line 8—8.

Figure 9 is a fragmentary top plan view of one end of the roller and associated parts shown in Figure 2.

Figure 10 is a fragmentary sectioanl view showing the baking roller and part of the discharge spout in operation.

Figure 11 is a fragmentary sectional view through Figure 10 on line 11—11.

Figure 12 is a perspective view on a smaller scale of a finished article after it has been removed from the roller.

Figure 13 is a section of the finished article shown in Figure 12, said section being the commercial size to be dispensed.

Figure 14 is an elevation partly broken away of a slightly modified form of roller to that shown in Figure 1.

Figure 15 is an elevation of a finished baked article after the same has been removed from the roller shown in Figure 14.

Figure 16 is a longitudinal vertical section of a modified form of roller to that shown in Figure 14.

Figure 17 is a sectional view through Figure 16 on line 17—17.

Figure 1:
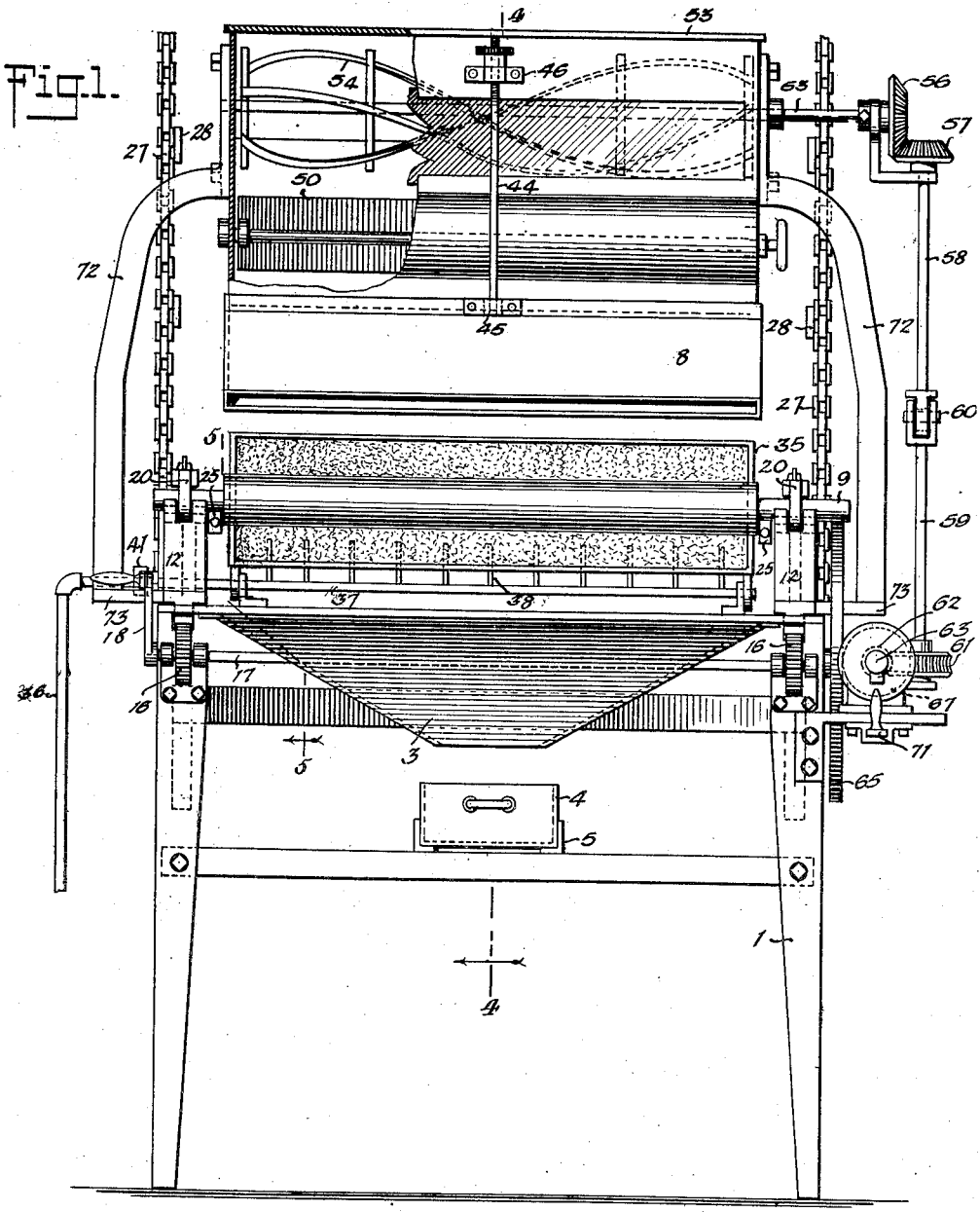
Figure 1 is a front elevation of the machine, disclosing an embodiment of the invention, certain parts being broken away.
Figure 2:
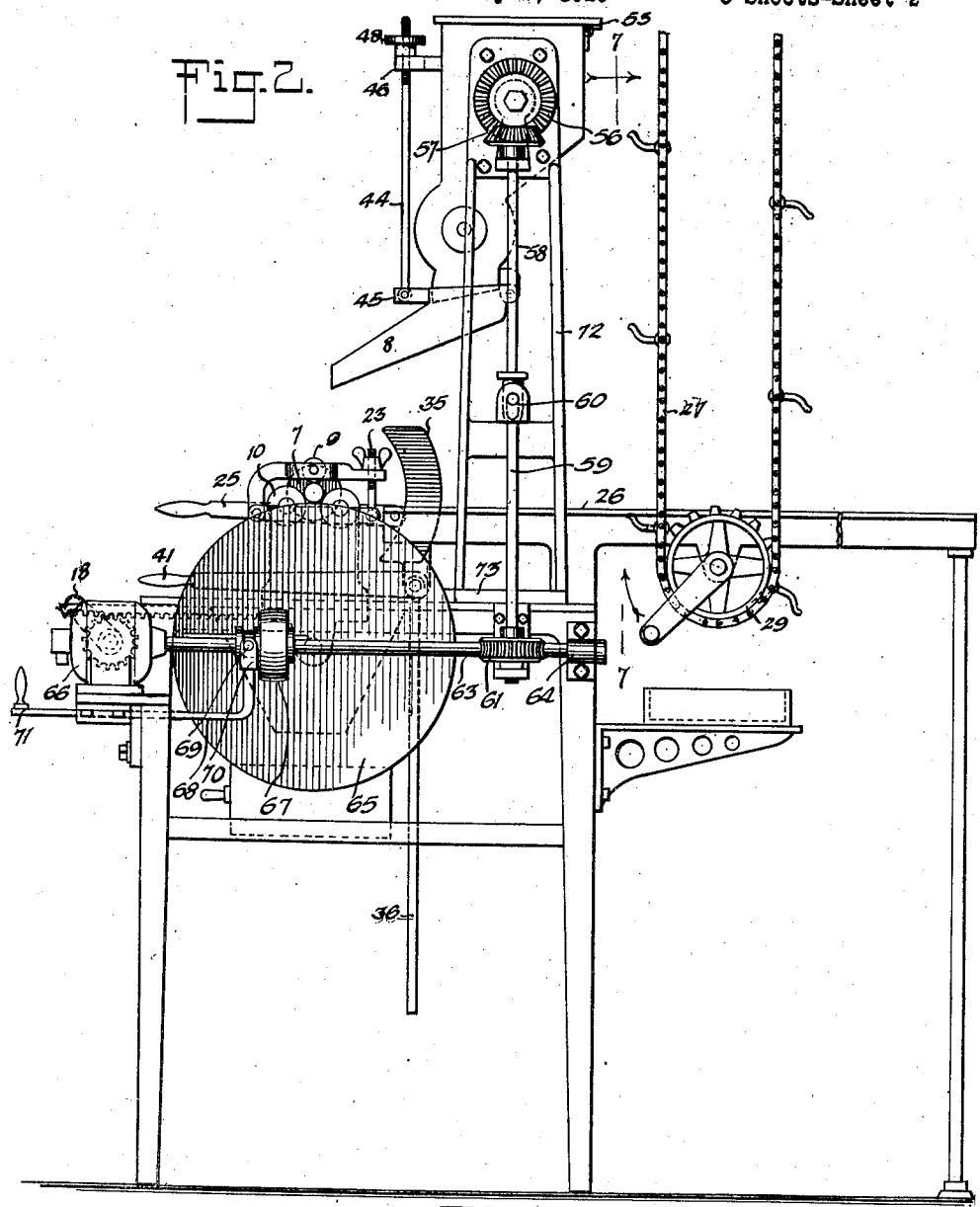
Figure 2 is a side view of the machine shown in Figure 1.

Figures 18, 20, 22, 24 26, 28 and 30 are elevations of different modified forms of rollers to that shown in Figure 1.

Figures 19, 21, 23, 25, 27, 29 and 31 are end views of the structures shown in Figures 18, 20, 22, 24, 26, 28 and 30.

Figure 32 is a longitudinal vertical sectional view through a further form of the invention in which means are presented for circulating a cooling medium.

Referring to the accompanying drawings by numeral, 1 indicates a frame of angle iron or other desired structure provided with a top plate 2 which may be secured to the frame 1 in any desired manner. A waste discharge chute 3 is carried by the plate 2 and directs any waste material to a suitable container 4 carried by the cross bars 5 of frame 1. The plate 2 is provided with an opening 6 (Figure 5) above the chute 3 so that waste material from the baking roller 7 or from the spout 8 may readily drop into the chute 3 and from thence into the container 4. The baking roller 7, as shown in Figures 1 to 8 inclusive, consists of a hollow roller carrying a rod 9, which extends therethrough and which is keyed or otherwise rigidly secured thereto so as to rotate therewith. This rod acts as a bearing shaft, and if desired, might be made integral instead of separate from the roller 7.

As indicated in Figure 5, the ends of the shaft 9 rest on the rollers 10 and 11. The pairs of rollers 10 and 11 are arranged on each side of the machine as shown in Figure 1 and each pair of rollers is mounted on a bearing carriage 12 of identical construction, said bearing carriages having depending members 13 for accommodating the shaft 14, which shaft connects the two carriages. Each carriage is provided with a rack 15 meshing with the gear 16 secured to the shaft 17 extending across the machine. The shaft 17 is provided with a crank 18 whereby the shaft may be rotated at any time and the respective carriages 12 moved forwardly or rearwardly simultaneously. If preferred, power means might be connected to the shaft 17 instead of the crank 18. Each of the carriages 12 is provided with a lug 19 to which a swinging frame 20 is pivotally connected, said frame carrying a roller 21 adapted to bear against the shaft 9 near its highest point. The frame 20 has a bifurcated end 22 for accommodating the swinging bolt 23, which bolt has a wing nut 24 mounted thereon whereby the parts may be released as shown in Figure 5 or locked together as shown in Figure 4.

Figure 3:
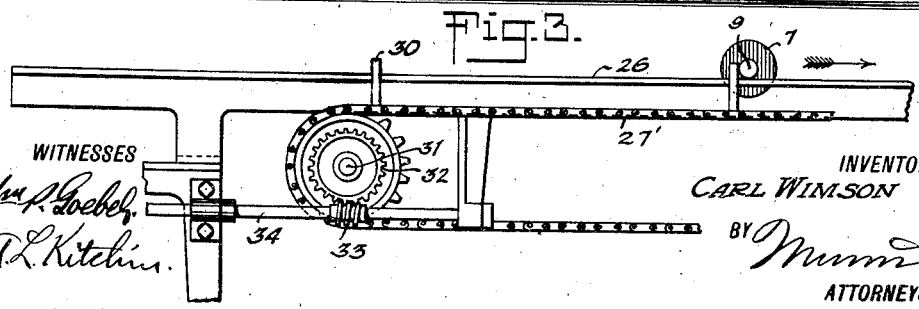
Figure 3 is a fragmentary side view of a machine similar to that shown in Figure 2 but showing a slightly modified construction of conveyor.

When the parts are assembled as shown in Figure 4, the shaft 9 rests upon the respective bearing rollers 10 and 11 and is held from moving upwardly by roller 21. Whenever it is desired to remove the baking roller 7, the auxiliary frames 20 are disconnected and moved over to the position shown in Figure 5. The discharge levers on opposite sides of the machine are then grasped and raised to substantially the dotted position shown in Figure 5 whereupon the baking roller 7 will move onto the runways 26, said runways being spaced a sufficient distance apart to accommodate the ends of the shaft 9 and roller 7 as shown in Figure 7. The roller 7 usually moves by gravity until it strikes against the chain 27 which forms part of the conveyor or elevating system. This chain is provided with a number of lifting arms 28 and passes over a lower pulley 29. The upper pulley and other parts associated with the chain 27 are not shown as they form no part of the present invention. Under some circumstances, instead of having the conveyor formed of the chain 27 and associated parts, a chain 27' is used as shown in Figure 3, which chain is provided with a number of posts 30 adapted to strike the ends of the shaft 9 and move the roller along the runways 26 for any desired distance.

When this form of the invention is used, there will be preferably two chains 27' used, though a greater number may be provided, said chains being driven by suitable gears connected to the shaft 31, which shaft has a pinion 32 rigidly secured thereto, said pinion having a worm pinion meshing with the worm 33. The worm 33 is connected with shaft 34 and said shaft in turn is mounted in suitable bearings carried by the frame 1. This shaft may have a crank or other power member connected therewith so as to be rotated at a desired speed.

In order to remove the baking roller 7 as above described, the heater or burner 35 is moved over to the dotted position shown in Figure 4 so as to be out of the way. This burner may be a gas burner or electric burner as preferred. In the drawing, a gas supply pipe 36 has been shown which is connected in any suitable manner to the burner pipe 37, which pipe is provided with a plurality of tips 38 from which flames project into the chamber 39 and heat the front member 40 which may be asbestos or other material. Where gas is used, the air gap is provided below and also if desired, above the tips 38 whereby a proper combustion may be secured. A hand actuated lever 41 is secured to a depending lug 42 projecting from the burner 35 whereby when said lever is raised, the burner 35 will be moved downwardly to the dotted position shown in Figure 4. The connection between pipe 36 and pipe 37 is such that this swinging action may be permitted. After the burner has been moved to the dotted position shown in Figure 4 lever 25 is raised and the roller 7 with its covering of baked pastry is discharged as shown in dotted lines in Figure 5. The arms 25 are then moved back to their former position, a new roller 7 supplied and then the auxiliary frame 20 moved back to the position shown in Figure 4. When these adjustments have been made, the burner 35 is again moved to its vertical operative position as shown in Figure 4 and a new supply of substantially liquid pastry in a raw state is discharged from the spout 8 onto the roller 7, said roller being meanwhile rotated as hereinafter fully described. The spout 8 is pivotally mounted at 43 and the outer end is swung upwardly and downwardly by reason of the adjustment of the rod 44 which is pivotally connected at 45 to the spout, said rod extending loosely through a bracket 46 carried by the hopper 47. An adjusting screw 48 is carried by the rod 44 for raising and lowering the same and thereby regulating the discharge end of the spout 8. Ordinarily, the spout 8 is arranged in a relative position to roller 7 as shown in Figure 10. As the comparatively liquid raw pastry or dough 49 strikes the roller, it will become baked or cooked almost immediately by reason of the heat from the burner 35. In fact, the heat from this burner will begin to act upon the liquid pastry 49 while it is still in the air so that it will be in a sticky condition when it strikes the roller and before it moves away from the influence of the burner 35 it will become properly cooked. The roller 7 may be rotated once or a large number of times so as to provide one layer or a large number of layers in the pastry as indicated in Figure 10. As the layers of pastry build up on the roller 7, said roller is gradually moved away from the burner 35 and the periphery of the baked pastry on the roller will have the same relation to the discharge end of the spout 8 as the roller 7 formerly had in respect to the spout 8 so that the discharge from spout 8 will be in substantially the relative position shown in Figure 10. The relative position of roller 7 and the discharge end of spout 8 may be varied by the nut 48 or by the action of crank 18 in moving the roller 7 toward and from the burner 35. After the desired amount of pastry has been provided the butterfly valve 50 is closed and, consequently, the flow of the raw pastry from the spout 8 will cease. As soon as this has occurred, the burner 35 is swung to the dotted position shown in Figure 4, the auxiliary frames 20 are moved to the position shown in Figure 5 and the levers 25 immediately raised to cause the roller 7 with its baked article of pastry to be discharged onto the runways 26.

From Figure 1, it will be seen that the discharge end of the spout 8 is of the same width as the length of the roller 7 so that the finished tube of pastry will be of the same length as illustrated in Figure 12. In order to prevent certain kinds of pastry from sticking to the roller, a covering of oiled paper 51 may be placed on the roller 7 before the pastry begins to flow. After the finished article has been removed, it will appear as shown in Figure 12 and may be cut up into short lengths as shown in Figure 13 to be filled with any desired filling, as for instance, whip cream. The valve 50 is arranged in a valve casing 52 which merges into the lower part of the hopper 47 or is rigidly secured thereto. The hopper 47 may be made of any size and shape and is preferably provided with a mica or glass section 47' so that the material may be inspected readily. In addition, a lid or cover 53 is hingedly secured to the hopper 47 to protect the batter which is supplied to the hopper from time to time as desired. A stirring paddle construction 54 is arranged in the hopper 47 and is continually rotated when the device is in use. This rotation is produced by the shaft 55 of the stirring member extending through the casing of the hopper and having secured thereto a bevel gear 56 meshing with a bevel pinion 57 driven by the shaft 58. The shaft 58 is coupled to the shaft 59 by any desired form of universal coupling 60 while shaft 59 is rigidly secured to the worm gear 61 meshing with the worm 62, which worm is rigidly secured to the shaft 63 and said shaft extends through a suitable supporting beam 64 and also across the disk 65 and is rigidly connected in any suitable manner with the electric motor 66 by which it is driven. Splined on the shaft 63 is a friction wheel 67 which is provided with a grooved extending hub 68 for receiving the pins 69 of yoke 70, which yoke is connected with a handle 71 whereby the operator may slide the wheel 67 along the shaft 63 and, consequently, vary the speed of drive of disk 65 which is rigidly secured to shaft 14.

From Figure 9 it will be observed that the wheel 67 bears continually against the disk 65 for driving the same and with said disk in turn continually engages one end of the shaft 9 for rotating said shaft. In connection with the universal coupling 60 and the drive for the mixing blades 54, it will be noted that the upper frameworks 72 are rigidly secured to a rearward extension 73 of the carriages 12. By having the hopper 47 connected in this manner to the carriages 12, whenever these carriages are moved by the action of crank 18 and associated parts for shifting the roller 7, the hopper will be shifted correspondingly. Preferably, after each shifting action of the carriages 12, the nut 48 is moved for re-adjusting the discharge end of spout 8 to compensate for the difference in thickness of the deposited pastry on roller 7. These two adjustments are carried out intermittently until the desired thickness of pastry has been baked on the roller 7 and then the roller discharged as heretofore described and a new one substituted.

Instead of having the cylindrical roller 7 as shown in Figures 1 to 9 inclusive, a tapering roller 7' might be provided as shown in Figure 14 and when formed tapering, the roller is preferably made into sections, said sections being keyed onto the shaft 9. When the roller 7' is used, a finished article 75 is the result, said finished article being finished tapering instead of straight as shown by the finished article 76. The surface of the finished articles 75 as well as the finished articles 12, is comparatively rough and presents scrolled portions and grooved portions by reason of the batter receiving the rotary and tumbling motion due to the revolving and inclined surface of the roller 74 and exposure to the heat in descending and on coming in contact with the roller. The layers thus formed will have somewhat the appearance of the grains of a log of wood when cut through or bisected.

In Figures 16 and 17, a further modified form of roller is provided which is formed with a central tubular section 78 split at one point as indicated in Figure 17. The central tubular structure 78 is formed preferably of resilient metal and would contract as indicated in dotted lines in Figure 17 when separated from the end members 79 and 80, which end members are provided with tapering portions 81 and 82 adapted to be forced into the ends of the tubular body 78 whereupon said tubular body is spread into a correct tubular formation and the portions 81 and 82 are pinched and thereby held in position. The shaft 9 may be provided and caused to extend through this form of roller or the end members 79 and 80 may act as a substitute for shaft 9.

Figures 18 to 31 show additional forms of rollers which are used in the same way as roller 7 but which present finished baked articles of pastry of different shapes. After the finished article has been completed as shown in Figures 12 or 15, it may be disposed of in that condition or it may be cut into small sections and provided with a filling of some desired kind preparatory to vending.

Figure 32 shows a sectional view through a roller 7″ which is preferably made hollow and provided with end members 83 and 84 acting as journals, said end members being provided with passage-ways therethrough to which pipes 85 and 86 are connected, said pipes being designed to supply air, water or other cooling medium to the interior of roller 7″. It will be evident from this structure that a cooling medium may be likewise applied to any of the other rollers disclosed, in case it should be necessary. For instance, in Figures 1 and 4, a tubular roller has been shown with a shaft extending entirely therethrough. If end members 83 and 84 were substituted for the shaft, a cooling medium might be used.

What I claim is:—

1. A rotary baking pastry machine, comprising a hopper, an adjustable spout for directing batter from the hopper, a roller for receiving said batter, means for rotating the roller in proportion to the speed of the discharge of the batter, and means for heating the batter after it leaves the spout, said heating means acting on the batter while it is in the air and while it is engaging the roller, said heater acting sufficiently fast to bake the batter before the movement of the roller moves the same out from under the influence thereof.

2. A baking machine, comprising a roller, means for rotating the roller, a burner, means for relatively moving the roller and burner in respect to each other to vary the distance therebetween, means including a spout for directing batter onto said roller, and means for adjusting the discharge end of said spout so as to regulate the space on the roller receiving the batter.

3. A baking machine, comprising a rotatable baking roller, means for discharging batter onto said roller, means for cooking the batter on the roller, a runway arranged adjacent said roller, means for discharging the roller onto said runway, and a conveyor for conveying the roller to a distant point after it has been discharged onto said runway.

4. A rotary baking machine, comprising a roller, a burner for heating material deposited on the roller, a carriage for supporting the roller, a hopper connected with the carriage and movable therewith, a spout for directing batter from the hopper onto said roller, means for moving the carriage, hopper and spout in such a manner that the roller will be moved toward and from the burner, and means for rotating said roller during the depositing of the batter thereon.

5. In a baking machine for baking pastry, a roller for receiving the batter to be baked, a heater for baking the batter on the roller, a sliding carriage carrying said roller, said carriage being movable toward and from the heater, a pair of racks connected with said carriage, a pinion meshing with each rack, a shaft connecting said pinions, and means for rotating said shaft for operating said pinions and thereby causing a movement of said carriage.

6. In a baking machine of the character described, a carriage provided with supporting rollers, a baking roller journaled on said rollers, a fastening frame connected with said carriage and provided with a retaining roller acting to hold the baking roller in position, and pivotally mounted means for moving the baking roller off of the carriage, said means acting after the fastening frame has been moved to an inoperative position.

7. In a baking machine of the character described, a roller for receiving batter to be baked, a heater for heating the batter on the roller, means for rotating said roller while exposed to the heat of the heater, means for swinging the heater to one side, a pair of manually actuated levers for discharging the roller carrying the baked batter, and guideways for receiving said roller and guiding the same to a discharge point.

8. In a baking machine of the character described, a baking roller, means for baking batter deposited thereon, and means for depositing batter thereon, said last mentioned means comprising a hopper, a valve for controlling the discharge from the hopper, a discharge spout for directing the batter from the valve to a proper point on said roller, and means for adjusting said spout.

9. In a baking machine of the character described, a hopper for receiving batter, means for stirring the batter in the hopper, means acting as a valve for regulating the flow of batter from the hopper, a spout for directing the batter from the valve to a desired point, and adjusting means for moving the spout so as to cause the same to discharge at different points.

10. In a baking machine of the character described, a hopper for receiving batter, a valve for controlling the flow of batter from the hopper, a spout for directing the batter from said valve, a rod supporting one end of the spout, and means including a nut acting on said rod for swinging said spout and thereby causing the same to discharge at different points.

11. In a baking machine of the character described, a supporting frame, a plate carried by said frame, a pair of carriages slidingly mounted on said plate, a pair of uprights connected with said carriages, a batter carrying hopper carried by said uprights, means for directing batter from said hopper to a point near said carriages, a baking roller mounted on said carriages for receiving batter from said hopper, a burner normally positioned near said roller for baking the batter as it is deposited on the roller, means for rotating the roller and simultaneously stirring the batter in said hopper, and means for moving the carriages and hopper in such a manner as to vary the distance between said roller and said burner.

12. In a baking machine of the character described, a baking roller for receiving the batter to be baked, a pair of carriages for rotatably supporting said roller, a rack extending from each of the carriages, a pinion meshing with each of said racks, a shaft rigidly connected with each of said pinions, means for supporting said shafts, and means for rotating said shafts for moving said racks and carriages.

13. In a baking machine of the character described, a baking roller comprising a tubular member and a shaft connected therewith and extending therethrough, said shaft projecting beyond the tubular member, a carriage for rotatably supporting said baking roller, means for rotating said baking roller, means for directing batter onto the roller while it is being rotated, a heater arranged to extend for substantially the full length of the roller for heating the batter before and after it is deposited on the roller, means for moving the heater out of the vicinity of the roller, and means for causing the roller to move to a distant point.

CARL WIMSON.